3,405,553
PROCESS AND APPARATUS FOR DETERMINING THE PERMEABILITY OF SOLIDS
Pierre Boisard, Pau, and Jean Lamazou, Buros, France, assignors to Societe Nationale des Petroles d'Aquitaine, Paris, France
Filed Nov. 2, 1964, Ser. No. 408,032
Claims priority, application France, Nov. 4, 1963, 952,606
15 Claims. (Cl. 73—38)

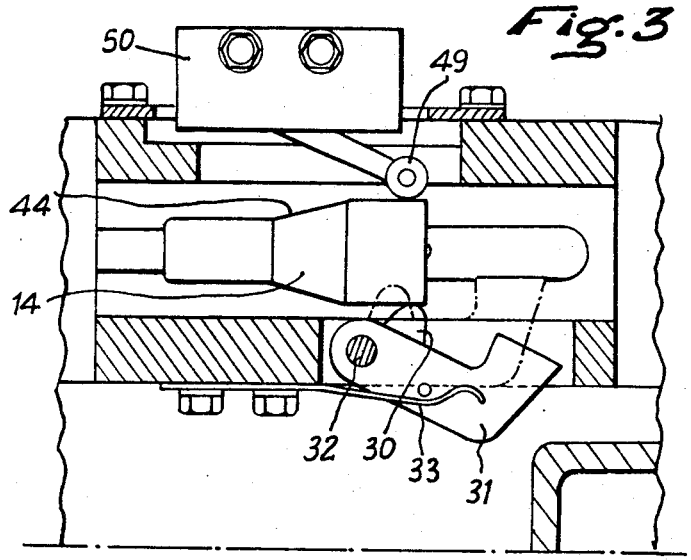
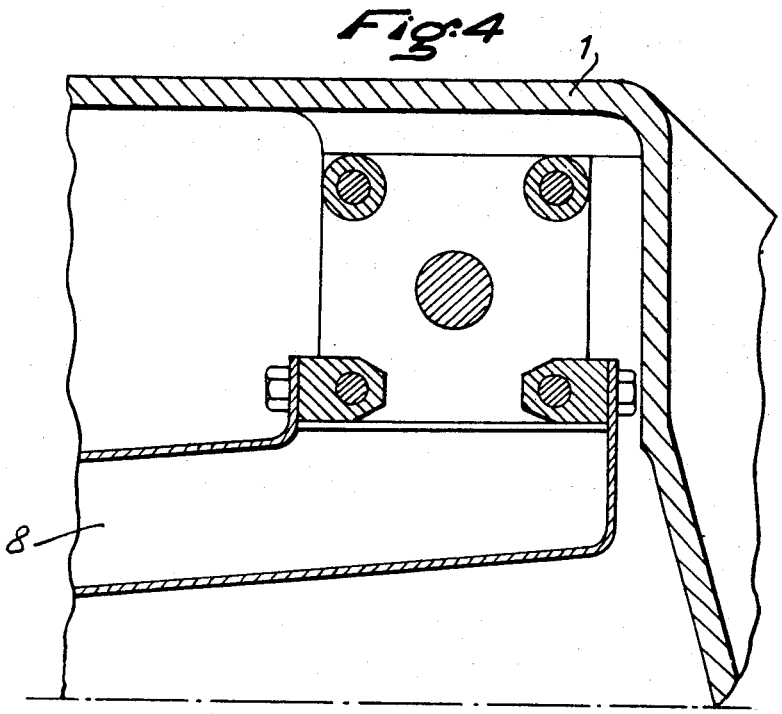

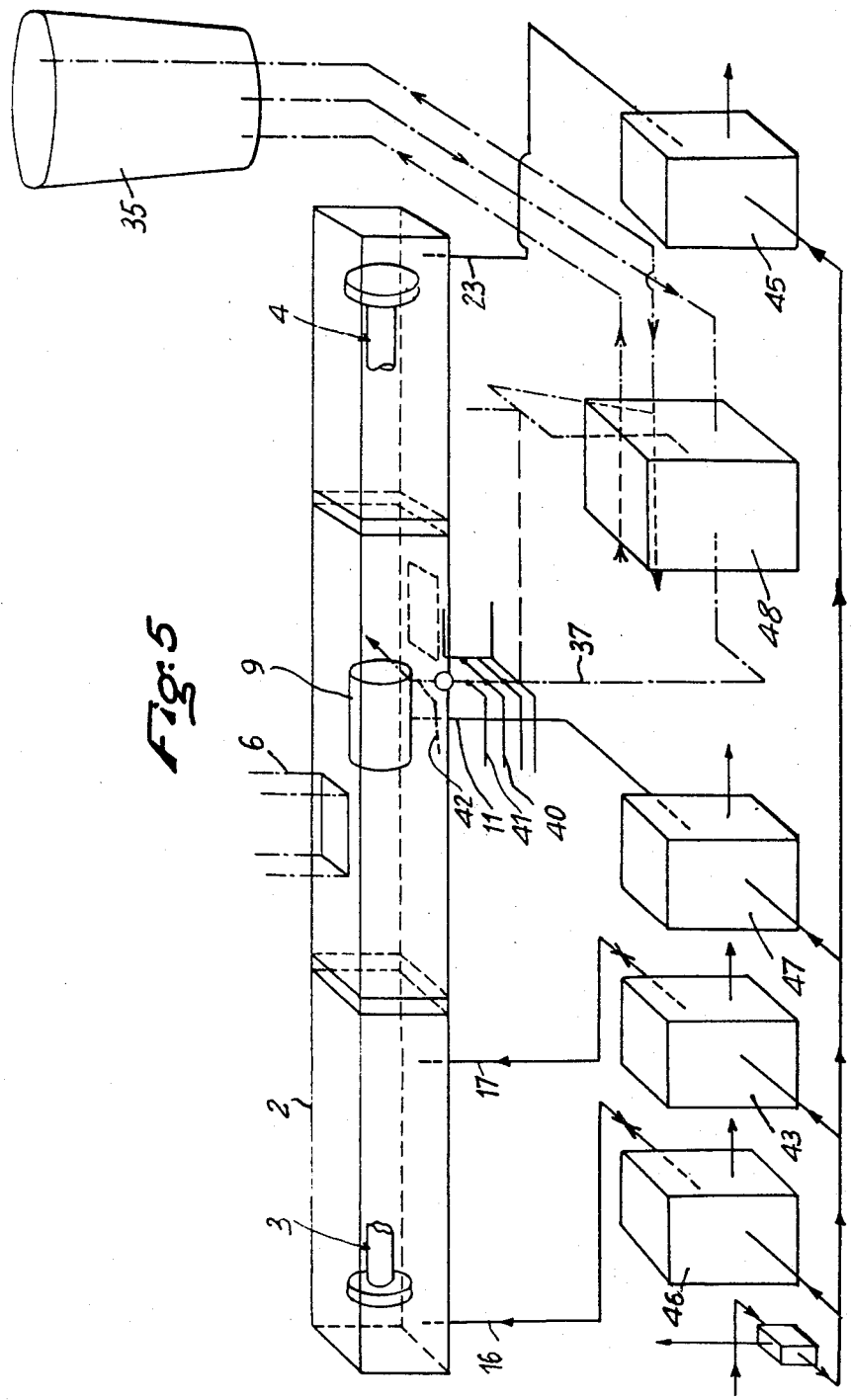

The present invention relates to a process and an apparatus by which it is possible to carry out automatically the measuring and recording of the permeability of solid samples, such as the cores of minerals resulting from drilling in the ground.

In connection with the production of underground or artificial reservoirs, the knowledge of the permeability of a rock is an essential parameter for appreciating the ability of a fluid (gas or liquid) to circulate in the pores of the material in question.

The measurement of the permeability is carried out for this purpose on test elements or samples cut in the cores originating from exploratory or production shafts.

The known means for carrying out this measurement of permeability with the aid of the usual parameters involve a particular handling for the positioning of each test element and the full time presence of an operating technician for the control of a difference in pressure to be applied between the end faces of the (generally cylindrical) test element and the measurement of a time for the flow of a certain volume of fluid (generally a gas) through the said test element.

With the known apparatus, there is in fact measured the time taken for a known volume of gas to flow through the sample, and by the application of the Darcy law, this enables the permeability of the sample which is studied to be appreciated.

The result of that which is set out above is that the known parameters have as their main disadvantage the fact of requiring the constant presence of an operator for making the corresponding measurements on a series of test elements.

The present invention has for its particular object to overcome the aforesaid disadvantages. It comprises a process for determining the permeability of solid samples, characterised in that a plurality of substantially cylindrical samples are admitted to a storage zone, that a succession of operations are automatically initiated, consisting in transferring the said samples one at a time into a handling and measuring circuit, the lateral face of the sample admitted into the said circuit is made tight, one of the end faces of the sample is then isolated from the ambient atmosphere, a gas current at given pressure is caused to pass through the said sample from the said isolated face, the time taken for a given volume of the said gas to pass through the sample is measured and, for each sample, its order number and the time taken for the given volume of gas to pass through the sample are recorded, and from it the nature and the time of passage of the gas through the sample, there is deduced the value of the permeability of the sample, considered by application of the Darcy law.

In accordance with one feature of the process according to the invention, a current of gas is caused to pass through the sample for a time which is between pre-established lower and upper limits, the volume of said gas current corresponding to a unit volume or to a multiple of the latter.

The invention also related to an apparatus for carrying out the foregoing process, this apparatus comprising: in a first housing, a master cylinder provided with two pistons and means for making tight the lateral face of a cylindrical solid sample, means for introducing the samples into and discharging them from the master cylinder, means for displacing the said samples in the said master cylinder and means for bringing one of the faces of the sample into contact with a gaseous current of fluid under pressure, and in a second housing, control means by which are controlled the foregoing devices and means for measuring and recording the time taken for a given volume of gas to pass through the sample.

According to another feature of the invention, the means for sealing the lateral face of a sample are formed by a ring which is fast with the master cylinder and which carries an elastic membrane or diaphragm by which it is at least partially covered and of which the deformation, under the effect of a fluid under pressure, causes it to come into contact with the lateral face of a sample introduced into the ring.

The invention also covers the features which are hereinafter described and the various possible combinations thereof.

An apparatus designed for carrying out the process according to the invention is illustrated as a non-limiting example in the accompanying drawings.

FIG. 3 is a section on the line III—III of FIG. 1, showing more particularly the position of the latch or pawl associated with the loading device of the apparatus.

FIG. 4 is a section on the line IV—IV of FIG. 1, showing the positioning of the discharge chute for the samples.

FIG. 5 is a diagrammatic view showing the pneumatic and hydraulic circuits of the apparatus shown in FIGS. 1 to 4.

Figure 1:
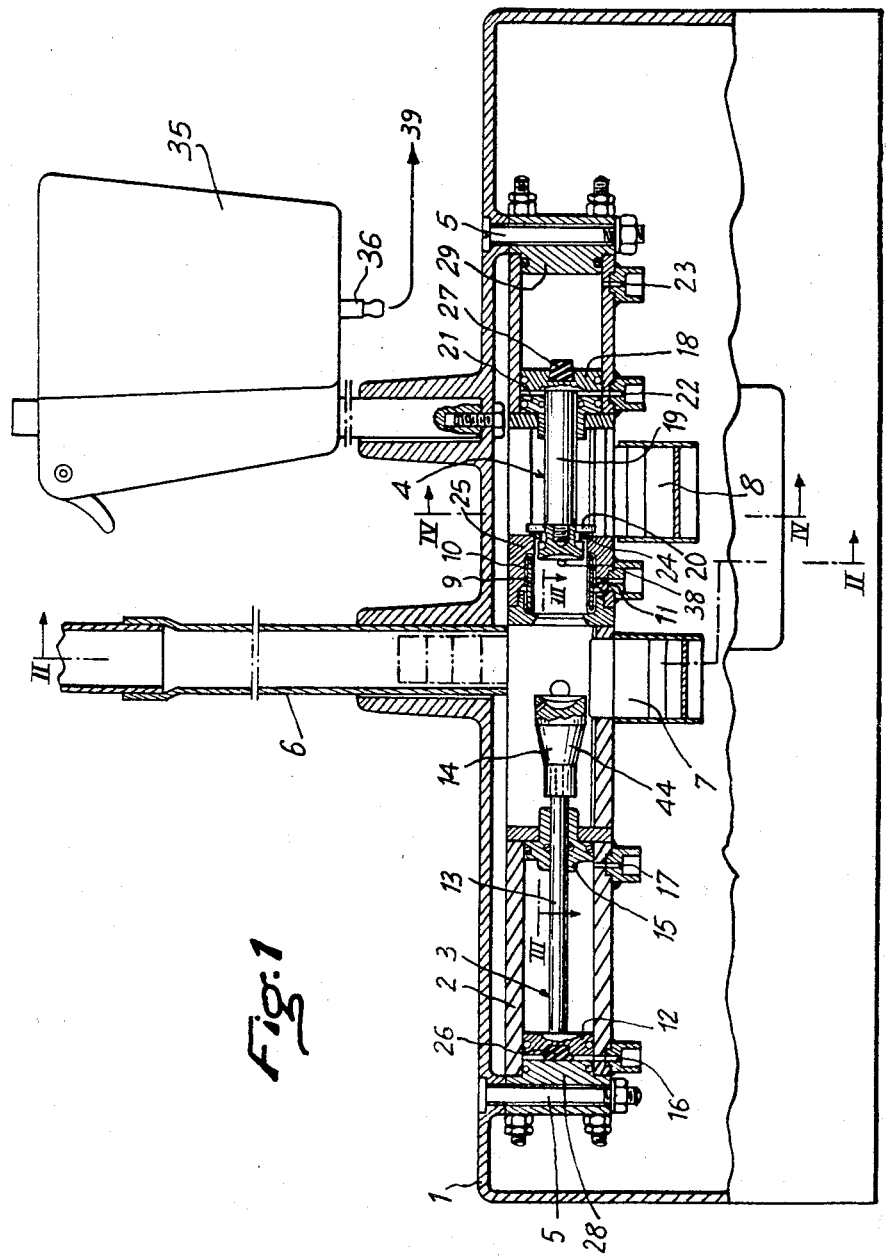
FIG. 1 is a front sectional view on the line I—I of FIG. 2, showing an apparatus according to the invention and more particularly the mechanical control means of the apparatus.

The apparatus according to the invention comprises, as shown in FIGS. 1 to 5, on the one hand a mechanical assembly controlled by pneumatic or hydraulic circuits and, on the other hand, an electric assembly (not shown) by which are supervised the controls of the first assembly. These two assemblies are preferably disposed one below the other in separate housings.

The mechanical assembly and its control means comprise, in a housing or casing 1, a master cylinder 2 containing two pistons 3 and 4, the purpose and operation of which will hereinafter be more fully explained.

The master cylinder 2 is secured to the housing 1 by bolts 5 and is disposed in a substantially horizontal plane. The following are connected to the master cylinder 2:

To the upper part thereof, a loading device 6 adapted to contain a series of samples and to permit the successive introduction of the said samples into the master cylinder for the purpose of measuring the permeability of said samples, To the lower part, a discharge chute 7 for any dust possibility entrained with the samples, Also to the lower part, a discharge chute 8 for the said samples.

Between the loader 6 and the sample discharge chute 8, the master cylinder 2 is provided with an assembly designed to ensure the fluid tightness of the lateral wall of a sample. This assembly comprises a ring 9 partially surrounded by an elastic membrane 10, an internal cavity of the said ring being connected by a passage 11 extending through the master cylinder 2 to a source of fluid under pressure ensuring at will the deformation of the membrane 10 and the bringing of the latter into contact with the lateral wall of the sample brought to the interior of the membrane-carrying ring 9.

It is in this position inside the said ring 9 that the sample is subjected to a constant gas pressure for ensuring the measurement of the permeability, which is the object of the process according to the invention.

The movements of a sample inside the master cylinder 2, that is to say from its admission into the master cylinder by means of the loader 6 until its discharge through the chute 8 are assured by the pistons 3 and 4.

The piston 3 comprises a head 12 connected to one end of a rod 13 which carries at its other end a cap 14.

The movements of the piston 3 inside the master cylinder 2 are guided in the usual way by a ring 15 fast with the master cylinder 2, and are caused by a fluid under pressure admitted into the chamber of the master cylinder on either side of the piston head 12 through bores 16 and 17, respectively.

The piston 4 comprises a head 18 fixed to the end of a rod 19, which carries at its other end a cap 20.

The guiding of the movements of the piston 4 is assured by a ring 21, which is also fast with the master cylinder 2 and the movements of said piston inside the said cylinder are caused by a fluid under pressure admitted into the chamber of the master cylinder on either side of the piston head 18 through passages 22 and 23, respectively.

The cap 20 of the piston 4 carries an annular joint 24 which, at the end of the travel of the piston 4 towards the membrane-carrying ring 9, is flattened between a shoulder of the said cap and a bearing surface 25 on the master cylinder, with the object of shutting off the chamber partially defined by the said membrane or diaphragm 10 in the vicinity of one of the ends of the latter.

The caps 12 and 18 of the pistons 3 and 4, respectively, are provided on the faces opposite those receiving the rods 13 and 19 with resilient stops 26 and 27 preventing the piston heads 12 and 18 reaching the end plugs 28 and 29 of the master cylinder 2.

The cap 14 of the piston 3 has the general form of a body of revolution, permitting it to cooperate with the finger 30 of a latch or pawl 31 pivoting on a pivot 32 and, according to its position, allowing or preventing the bottom sample of a group of samples contained in the loader 6 to enter the master cylinder 2.

As will be more clearly seen from FIG. 3, the pawl 31 is constantly urged towards its closed position, shown in chain-dotted lines, by a spring 33.

On the other hand, the housing 1 of the apparatus supports a water tank 35 connected at 36 by means of a pipe (not shown) to a flask 37 of calibrated volume, opening by way of a passage 38 into the internal volume of the chamber defined partially by the membrane-carrying ring 9 and the head 20 of the piston 4, when the latter is in the position shown in FIG. 1. The passage 38 in fact opens in the region of the shoulder 25 on the master cylinder 2 and permits a gas under known pressure being admitted to the opposite face of the sample.

Since the other face of the sample is in the open air, it is thus possible to achieve a flow of gas under constant differential pressure through the sample.

By measuring under these conditions the time taken for a known volume of gas to flow through the sample, the application of the Darcy law enables the permeability of the sample under consideration to be established.

The sample is preferably of cylindrical form and of standard dimensions, and has for example a diameter of 24 mm. and a length of 25 mm.

The circulation of the gas at known pressure through the sample then contained in the membrane-carrying ring 9 is assured by a column of water supplied by a constant level tank 35, which column rises into the flask 37 of calibrated volume and displaces the air which it contains at substantially constant pressure.

Figure 2:
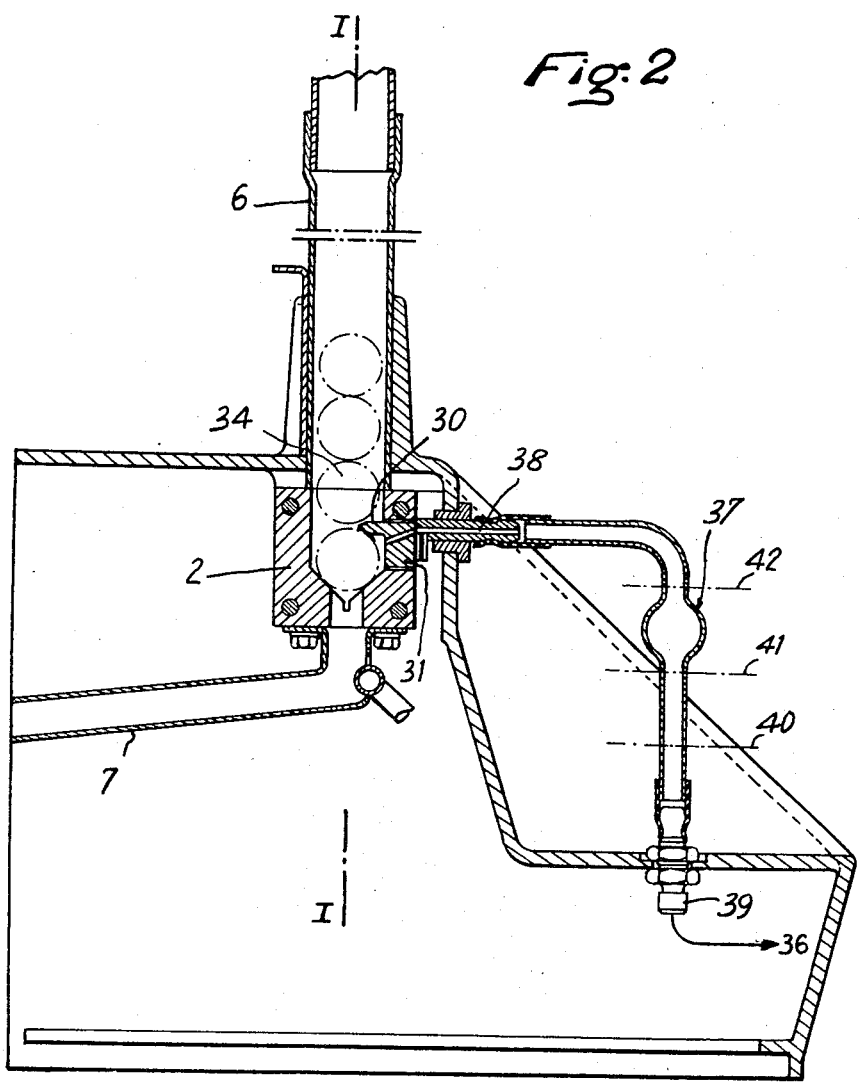
FIG. 2 is a view from the left on the section line II—II of FIG. 1.

The lower union 39 of the calibrated volume flask 37 is for this purpose connected to the union 36 of the water tank 35 (FIGS. 1 and 2).

The determination of the volume of air admitted into the chamber partially defined by the membrane-carrying ring 9 and the head 20 of the piston 4 is assured by an assembly of photo-electric cells (not shown), positioned at the levels indicated at 40, 41 and 42 in FIG. 2.

The passage of the free surface of the water admitted through the nozzle 39 opposite each of the cells disposed in the aforesaid levels makes it possible, as will later be seen, to measure effectively the volume of gas or air passing through the sample of which the permeability is to be measured.

Preferably, the calibrated volume flask 37 is constructed in such a way that the volume between the level 40 and the level 42 is a multiple of the volume defined between the levels 40 and 41. In one preferred embodiment of the invention, the volume defined between the level 40 and the level 42 is given a value ten times greater than that of the volume between the levels 40 and 41.

These two volumes, which will be referred to respectively in the following description as V and 10V, then correspond to two reading-off scales interconnected by a coefficient 10.

By way of indication, the unit volume between the level 40 and the level 41 may have a value of 849 mm.$^3$, the volume between the level 40 and the level 42 then having a value of 8490 mm.$^3$.

The photoelectric cells situated at the aforesaid levels belong to an assembly for measuring and recording the testing time, that is to say, for measuring the time taken for a predetermined volume of gas to pass through the sample.

The arrangement is carried out in such a way that the testing time remains between a lower limit and an upper limit. By way of indication, the following values can be given: two seconds for the lower limit and 200 seconds for the upper limit, which values will be used in the following description, but they do not imply any particular limitation of the application.

The maximum duration of an experiment having been fixed at 200 seconds, the second reading-off scale previously referred to permits an extension of the measuring possibilities of the arrangement:

If the volume 10V flows in less than 200 seconds, it is the photoelectric cell situated at the level 42 which detects the passage of the free surface, then causing the end of the counting of the time and the recording.

If the volume 10V flows in more than 200 seconds but in less than 2000 seconds, it is the photoelectric cell positioned at the level 41 which then detects the passage of the free surface for a time which is between 20 and 200 seconds and causes the end of the counting and the recording.

With the object of avoiding the recording controlled by the cell situated at the level 42 being caused before the minimum time of 2 seconds has elapsed, the arrangement is provided with a two-second time relay. In this case, the recording arrangement only assures the printing of the order number of the sample.

Furthermore, in order to eliminate the samples of which the permeability would be sufficiently low for the time of flow of the volume V to be greater than 200 seconds, the arrangement is provided with the following means:

A safety volume between the normal level of the water originating from the tank 35 and the level 40, a said volume corresponding for example to 170 mm.$^3$, which would be absorbed in 40 seconds at a minimum by such a sample.

A relay timed at 40 seconds, permitting the stopping of the experiment and causing the discharge of the sample if the free surface has not reached the level 40 before these 40 seconds.

The counting and recording of the values resulting from the measurements are carried out by means of an apparatus which is known per se and which comprises for example a pulse transmitter driven by a synchronous motor and transmitting a pulse every tenth of a second and a printing device comprising three counters, one corresponding to the printing of the order numbers of the samples, the second to the testing time achieved with the passage of the volume 10V, and the third to the testing time achieved by the passage of the volume V.

The use of the apparatus according to the invention with the object of ensuring the measurement of the permeability of samples takes place in the following manner, the different operations being caused in succession by a programming device, which controls the various elements of the arrangement.

After the samples have been introduced into the loader 6, the opening of an electromagnetic valve 43 causes the return movement of the pneumatic piston 3 (FIGS. 1 and 5). With its return movement, a surface 44 of the cap 14 removes the finger 30 of the latch 31 and the lower sample 34 of the series of samples contained in the loader 6 falls by gravity into the master cylinder 2. During the retraction of the piston 3, the opposite piston 4 controlled by the opening of an electromagnetic valve 45 comes into abutment with the membrane-carrying ring 9, and on completion of its travel flattens the joint 24.

The opening of a valve 46 then controls the advance of the piston 3, and this piston, by means of its cap 14, introduces and pushes the sample into the rubber membrane or diaphragm 10 until the said sample is applied to the front face of the cap of the piston 4.

The force acting on the piston 4 is chosen to be greater than that acting on the piston 3 and thus there is fluid tightness at the level of the joint 24 throughout the measuring operation.

The control of the opening of an electromagnetic valve 47 causes the deformation of the membrane 10 by admission of fluid into the lower cavity of the ring 9 and consequently the contact thereof with the lateral face of the sample which is then contained in the said ring.

By the opening of an electromagnetic valve 48, the front face of the sample contained in the ring 9 is then brought into communication with the calibrated volume flask 37, in which obtains a predetermined gas pressure, assured by a constant weight of water in the tank 35.

The rear face of the sample is in communication with the atmosphere.

As soon as the electromagnetic valve 48 is open, the pressure is immediately established in the flask 37 and the air under pressure which is contained therein starts to circulate in the sample.

At the same time as the electromagnetic valve 48 is opened, a pulse transmitter driven by a synchronous motor (not shown) starts to transmit a pulse every tenth of a second.

When the free surface of the water which ascends into the flask 37 reaches the level 41, the photoelectric cell situated at this level controls the counting of the pulses of the preceding transmitter.

When the water, depending on the permeability of the sample, signals within the set time period its passage to the photoelectric cell situated at the level 41 or to that situated at the elevel 42, the cell concerned controls the stopping of the counting, the recording of the time of flow of gas in the sample and the resumption of the mechanical cycle, that is to say, the discharge of the sample from the master cylinder 2.

In order to obtain this discharge, the membrane or diaphragm 10 is decompressed under the action of the control of the electromagnetic valve 47 and the volume contained between the cap 20 of the piston 4 and its guide ring 21 is brought to atmosphere by control of the electromagnetic valve 45.

The front face of the cap 14 of the piston 3, which is always under pressure, pushes the sample through the ring 9 as far as the opening opposite the discharge chute 8, into which it falls.

At this moment, the pistons 3 and 4 reassume their initial position and the cycle recommences, for measuring the permeability of the following sample, which passes from the loader 6 to the master cylinder 2.

The apparatus is moreover provided with means which cause the automatic stoppage thereof when no samples are present, and also permitting the commencement of the cycle for a fresh series of samples.

After the last sample of a series, the piston 3 advances as for a fresh operation, but in the absence of a sample, continues its travel until it touches the sleeve 20 of the piston 4. The surface 40 of the cap 14 on the piston 3 then passes over a roller 49 of a microswitch 50, which controls the stopping of all the movable elements of the apparatus in the position occupied by them at this moment.

After a fresh series of samples has been introduced into the loader 6 (the piston 3 being in the position indicated above), a new cycle commences by the cylinder of the piston 4, controlled by the electromagnetic valve 45, being brought into communication with the atmosphere.

The piston 3 then advances in the same way as for discharging a sample, then returns to the initial position and because of this movement, controlled by the electromagnetic valve 43, it causes the release of the finger 30 of the latch 31 and the introduction of the first sample of the series into the master cylinder 2.

It is obvious that the invention is not limited to the embodiment which has been described and illustrated.

It will be possible if necessary to adopt other embodiments and other forms of the invention, without thereby departing from the scope thereof.

We claim:

1. An apparatus for determining the permeability of cylindrical samples of solid material, which comprises in combination: in a first housing, a master cylinder provided with two pistons and means for making fluid-tight the lateral face of a cylindrical solid sample of the material, means for introducing the samples into and discharging them from the master cylinder, means for displacing the said samples in the said master cylinder and means for bringing one of the faces of the sample in contact with a gaseous flow of fluid under pressure; and in a second housing, control means for controlling said pistons and means, and means for measuring and recording the time taken for a given volume of gas to pass through the sample.

2. Apparatus according to claim 1, wherein the fluid-tight means for the lateral face of a sample are formed by a ring which is fast with the master cylinder and which carries a resilient membrane at least partially covering it and of which the deformation, under the action of a fluid under pressure, causes it to come into contact with the lateral face of a sample introduced into the ring.

3. Apparatus according to claim 1, wherein the means for introducing the samples into the master cylinder are formed by a substantially vertical loading device supported by the housing and opening into the master cylinder, and in which the samples are stacked.

4. Apparatus according to claim 3, which is provided in the vicinity of the connection of the loading device with the master cylinder with a device for regulating under control the transfer of the lower sample of the samples contained in the loading device from the loading device to the master cylinder.

5. Apparatus according to claim 3, in which one of the two pistons contained in the master cylinder is arranged in alignment with the master cylinder to transfer a sample from opposite the loading device to the fluid-tight assembly.

6. Apparatus according to claim 2, wherein the second of the two pistons contained in the master cylinder is arranged in alignment with the master cylinder to assure in one of its end positions the fluid-tight closure of one of the ends of the chamber defined by the ring carrying the membrane.

7. Apparatus according to claim 2, wherein fluid tightness is obtained by a joint carried by the cap of the second piston and flattened between the said cap and an internal shoulder on the master cylinder.

8. Apparatus according to claim 1, wherein the means for discharging the samples are formed by a discharge chute carried by the housing and connected to the lower part of the master cylinder.

9. Apparatus according to claim 3, which comprises substantially opposite the loading device, but connected to the lower part of the master cylinder, a chute intended for the discharge of any dust which could be entrained with the samples.

10. Apparatus according to claim 2, which is provided with means for the admission of a gas under pressure to the vicinity of the face of a sample contained in the membrane-carrying ring, disposed facing the cap of the second piston of the master cylinder.

11. Apparatus according to claim 1, which is provided with means for the production of a gaseous flow, comprising a flask of calibrated volume connected to a water tank with a constant level and supported by the said first housing.

12. Apparatus according to claim 11, wherein said calibrated volume flask is arranged in such a way as to define an elementary volume between a lower level and an intermediate level and a second volume which is a multiple of the elementary volume between the lower level and an upper level.

13. Apparatus according to claim 12, wherein said second volume is ten times the elementary volume.

14. Apparatus according to claim 12, wherein photoelectric cells are disposed at the said levels with the object of ensuring the measurement of the displacements of the free surface of the liquid in the calibrated volume flask, the said flask being made of a transparent material.

15. Apparatus according to claim 14, wherein the photoelectric cells form part of a counting and recording assembly, of which they control the operations.

References Cited

UNITED STATES PATENTS

| | | | |
|---|---|---|---|
| 2,460,655 | 2/1949 | Rickmeyer | 73—38 |
| 2,705,418 | 4/1955 | Reichertz et al. | 73—38 |
| 3,258,117 | 6/1966 | Domeck et al. | 73—38 |

DAVID SCHONBERG, *Primary Examiner.*

W. A. HENRY, *Assistant Examiner.*